US012698649B1

(12) United States Patent
Wei et al.

(10) Patent No.: US 12,698,649 B1
(45) Date of Patent: Aug. 4, 2026

(54) DOOR LOCK DEVICE, DOOR, AND MOBILE VEHICLE

(71) Applicant: Jialong Wei, Nanyang (CN)

(72) Inventors: Jialong Wei, Nanyang (CN); Ning Li, Dongguan (CN)

(73) Assignee: Jialong Wei, Nanyang (CN)

( * ) Notice: Subject to any disclaimer, the term of this patent is extended or adjusted under 35 U.S.C. 154(b) by 0 days.

(21) Appl. No.: 19/387,292

(22) Filed: Nov. 12, 2025

Related U.S. Application Data

(63) Continuation of application No. 19/281,273, filed on Jul. 25, 2025, now abandoned.

(51) Int. Cl.
*E05B 55/12* (2006.01)
*E05B 47/00* (2006.01)
*E05B 63/14* (2006.01)

(52) U.S. Cl.
CPC .......... *E05B 55/12* (2013.01); *E05B 47/0012* (2013.01); *E05B 63/14* (2013.01); *E05B 2047/0017* (2013.01); *E05B 2047/0026* (2013.01)

(58) Field of Classification Search
CPC ...... E05B 47/0012; E05B 55/12; E05B 63/14; E05B 2047/0017; E05B 2047/0026; E05B 17/044
USPC .................................. 70/110, 222, 223, 472
See application file for complete search history.

(56) References Cited

U.S. PATENT DOCUMENTS 377,200 A * 1/1888 Jobborn .................. E05B 59/00 70/110
668,188 A * 2/1901 Jenkins ............... E05B 63/0017 70/427
1,126,560 A * 1/1915 Page ....................... E05B 55/12 70/151 R
1,675,041 A * 6/1928 Nakahara ................ E05B 17/14 70/401
3,242,706 A * 3/1966 Check ..................... E05B 59/00 70/110
3,257,135 A * 6/1966 Russell ................... E05B 59/00 292/192

(Continued)

FOREIGN PATENT DOCUMENTS

CN 1592812 A * 3/2005 ............. E05B 63/06
CN 110043132 A * 7/2019 ............. E05B 55/00

(Continued)

*Primary Examiner* — Steven A Tullia
(74) *Attorney, Agent, or Firm* — Birchwood IP

(57) ABSTRACT

A door lock device, including a housing, a lock tongue, a lock bolt, a clutch assembly, and a handle assembly. The lock tongue has an extended state and a retracted state. When the handle assembly drives the latch to switch from the extended state to the retracted state, the lock tongue drives the lock bolt to retract. The clutch assembly includes a lock bolt clutch component and a lock tongue clutch component. When the clutch assembly is in the first state, the lock tongue clutch component is in the engaged state, and the lock bolt clutch component is in the disengaged state. The lock tongue clutch component is used to restrict the lock tongue from retracting. When the clutch assembly is in the second state, the lock bolt is in the retracted state, and the lock bolt clutch component is used to restrict the lock bolt from extending.

19 Claims, 14 Drawing Sheets

(56) References Cited

U.S. PATENT DOCUMENTS

| | | | | | |
|---|---|---|---|---|---|
| 4,986,576 | A * | 1/1991 | Anderson | E05B 35/08 292/DIG. 31 |
| 5,027,625 | A * | 7/1991 | Krachten | E05B 65/1086 70/110 |
| 6,045,169 | A * | 4/2000 | Frolov | E05B 63/202 292/335 |
| 6,354,121 | B1 * | 3/2002 | Frolov | E05B 47/0692 292/164 |
| 6,526,787 | B2 * | 3/2003 | Ming-Chih | E05B 47/068 70/279.1 |
| 6,622,535 | B2 * | 9/2003 | Chiang | E05B 47/0692 70/277 |
| 6,725,693 | B2 * | 4/2004 | Yu | E05B 47/068 292/144 |
| 7,007,985 | B2 * | 3/2006 | Alexander | E05B 59/00 70/486 |
| 7,155,946 | B2 * | 1/2007 | Lee | E05B 59/00 292/169.14 |
| 7,377,140 | B2 * | 5/2008 | Shen | E05B 59/00 70/222 |
| 7,452,012 | B2 * | 11/2008 | Huang | E05B 63/0065 70/462 |
| 8,733,139 | B2 * | 5/2014 | Pickar | E05B 85/12 292/DIG. 31 |
| 9,085,919 | B2 * | 7/2015 | Bacon | E05B 81/77 |
| 9,540,853 | B2 * | 1/2017 | Pickar | E05C 1/14 |
| 10,907,381 | B2 * | 2/2021 | Lien | E05B 47/0692 |
| 11,873,662 | B2 * | 1/2024 | Jensen | E05B 55/00 |
| 12,110,711 | B2 * | 10/2024 | Lin | E05B 7/00 |
| 12,196,017 | B2 * | 1/2025 | Lin | E05B 81/76 |
| 12,305,431 | B2 * | 5/2025 | Lin | E05B 85/16 |
| 2002/0101083 | A1 * | 8/2002 | Toledano | E05B 63/20 292/332 |
| 2025/0314107 | A1 * | 10/2025 | Yao | E05B 81/18 |

FOREIGN PATENT DOCUMENTS

| | | | | | |
|---|---|---|---|---|---|
| CN | 212201664 | U | * | 12/2020 | |
| CN | 113622762 | B | * | 6/2022 | B60P 3/32 |
| CN | 111335748 | B | * | 6/2024 | E05B 63/146 |
| TW | I805490 | B | * | 6/2023 | E05B 63/08 |

* cited by examiner

DOOR LOCK DEVICE, DOOR, AND MOBILE VEHICLE

CROSS-REFERENCE TO RELATED APPLICATIONS

The present application is a Continuation of U.S. patent application Ser. No. 19/281,273, filed on Jul. 25, 2025.

TECHNICAL FIELD

The present disclosure relates to the technical field of smart door locks, specifically to a door lock device, door, and mobile vehicle.

BACKGROUND

With the development of smart homes and mobile vehicles (such as motor homes and yachts), traditional mechanical door locks have gradually transitioned towards electronic and intelligent systems.

Currently, widely used smart locks on the market primarily control motors to drive the movement of the latch or bolt to open or close the lock using methods such as touch, remote control, or passwords. However, these products have the following problems: firstly, the motor directly drives the lock bolt structure, which often results in jamming or even motor burnout due to external factors such as misalignment of the door or vibrations; secondly, the lock bolt can operate when the motor is powered on, but loses control and remains in an insecure free state when the power is off, thirdly, the linkage control between the lock bolt and the external handle cannot be achieved, requiring the handle to be locked separately; fourthly, some structures do not set up dual control channels for both electrical and manual controls, which prevents mechanical keys and electrical control logic from being interchangeable.

SUMMARY

The present disclosure provides a door lock device, to reduce the risk of motor damage and improve the reliability and safety of the door lock device.

To realize the above objectives, the present disclosure provides a door lock device, including a housing, a lock tongue, a lock bolt, a clutch assembly, and a handle assembly, the lock tongue, lock bolt, and clutch assembly are arranged within the housing, and the handle assembly is rotatably connected to the housing; the lock tongue has an extended state and a retracted state relative to the housing, and when the handle assembly is rotated, the lock tongue is driven to switch from the extended state to the retracted state; and the lock bolt has an extended state and a retracted state relative to the housing, and when the lock tongue switches from the extended state to the retracted state, the lock tongue is driven the lock bolt to retract relative to the housing; the clutch assembly includes a lock tongue clutch component and a lock bolt clutch component, and the clutch assembly has a first state and a second state; when the clutch assembly is in the first state, the lock tongue clutch component is in an engaged state relative to the lock tongue, and the lock bolt clutch component is in a disengaged state relative to the lock bolt; if both the lock tongue and the lock bolt are in the extended state, the lock tongue clutch component is configured to limit the lock tongue from retracting; when the clutch assembly is in the second state, the lock tongue clutch component is in the disengaged state relative to the lock tongue, and the lock bolt clutch component is in the engaged state relative to the lock bolt; if the lock bolt is in the retracted state, the lock bolt clutch component is configured to limit the lock bolt from extending, and the lock tongue is configured to extend or retract relative to the housing.

Furthermore, the clutch assembly further includes a transmission mechanism, which connects the lock tongue clutch component and the lock bolt clutch component; by controlling the transmission mechanism, to make the clutch assembly switching between the first state and the second state.

Furthermore, the lock tongue clutch component and the lock bolt clutch component are both rotatably connected to the housing; the transmission mechanism includes a swing arm, with a first end of the swing arm rotatably connected to the housing, and a second end movably connected to the lock tongue clutch component and/or the lock bolt clutch component; when the swing arm rotates in a first direction, the lock tongue clutch component and the lock bolt clutch component both rotate relative to the housing, with the lock tongue clutch component switching from the disengaged state to the engaged state, and the lock bolt clutch component switching from the engaged state to the disengaged state, to make the clutch assembly switching from the second state to the first state; when the swing arm rotates in a second direction opposite to the first direction, the lock tongue clutch component and the lock bolt clutch component both rotate relative to the housing, with the lock tongue clutch component switching from the engaged state to the disengaged state, and the lock bolt clutch component switching from the disengaged state to the engaged state, to make the clutch assembly switching from the first state to the second state.

Furthermore, the lock tongue clutch component is defined with a guiding groove, and the second end is inserted into the guiding groove; when the swing arm rotates in the first direction or the second direction, the second end moves along the guiding groove relative to the lock tongue clutch component, causing the lock tongue clutch component to switch between the disengaged state and the engaged state.

Furthermore, when the swing arm rotate along the first direction, the second end abuts the lock bolt clutch component, causing the lock bolt clutch component to switch from the engaged state to the disengaged state.

Furthermore, the clutch assembly further includes a first elastic component, which connects the lock bolt clutch component and the housing, and the first elastic component is configured to provide a driving force that drives the lock bolt clutch component to rotate, and the driving force is configured to drive the lock bolt clutch component to switch from the disengaged state to the engaged state.

Furthermore, the door lock device further includes a first driving assembly, which is connected to the first end, and is configured to drive the swing arm to rotate along the first direction or the second direction.

Furthermore, the first driving assembly includes a controller, the controller includes an electronic control device and a driving motor, the electronic control device is connected to the driving motor, and the output shaft of the driving motor is connected to the first end; the electronic control device is configured to control the output shaft of the driving motor to rotate, leading the swing arm to rotate along the first direction or the second direction; and the electronic control device includes at least one of the following modules: a password input module, a remote controller, a fingerprint recognition module, a facial recognition module, a palm print recognition module, an iris recognition module, a voiceprint recognition module, a near field communication (NFC) module, a Bluetooth module, or a mobile terminal signal transmission module.

Furthermore, the door lock device further includes a first handle, which is connected to the first end; and by rotating the handle, the swing arm is rotated along the first direction or the second direction.

Furthermore, the door lock device further includes a second driving assembly, which is connected to the second end, and is configured to drive the swing arm to rotate along the first direction or the second direction.

Furthermore, the second driving assembly includes a lock cylinder and a connecting component, the lock cylinder is set in the housing, and the connecting component is rotatably connected to the lock cylinder and the second end; when the lock cylinder rotates, the connecting component drives the swing arm to rotate along the first direction or the second direction.

Furthermore, the door lock device further includes a second elastic component, which is connected to the lock tongue and the housing, and the second elastic component is configured to provide a driving force to drive the lock tongue to extend.

Furthermore, the lock tongue clutch component includes a first protrusion; when the lock tongue clutch component is in the engaged state relative to the lock tongue, at least part of the first protrusion is located in a movement path of the lock tongue to abut the lock tongue and to limit the lock tongue from retracting; when the lock tongue clutch component is in the disengaged state relative to the lock tongue, the first protrusion is separated from the movement path of the lock tongue.

Furthermore, the door lock device further includes a second handle, which is rotatably connected to the housing; and when the second handle rotates relative to the housing, it abuts the lock tongue, causing the lock tongue to switch from the extended state to the retracted state.

Furthermore, the door lock device further includes a third handle, with the third handle and the second handle located on opposite sides of the door lock device along a thickness direction, and the third handle is rotatably connected to the housing; when the third handle rotates relative to the housing, it abuts the lock tongue, causing the lock tongue to switch from the extended state to the retracted state.

Furthermore, the door lock device further includes a third elastic component, the third elastic component is connected with the lock bolt and the housing, and the third elastic component provides a driving force that drives the lock bolt to extend.

Furthermore, the lock bolt includes a first connecting part, and the lock bolt clutch component includes a hook part; when the lock bolt clutch component is in the engaged state, when bolt retracts, the first connecting part and the hook part are interlocked, and the hook part is configured to restrict the lock bolt from extension.

Furthermore, the lock bolt clutch component further includes an inclined surface, the inclined surface is connected to the hook part; when the lock bolt clutch component is in the engaged state, if the lock bolt retracts, the first connecting part comes to connect with the inclined surface.

The present disclosure further provides a door, the door includes the door lock device mentioned above.

The present disclosure further provides a mobile vehicle, the mobile vehicle includes the door mentioned above.

In summary, in the door lock device of the present application, the lock tongue clutch component in the clutch assembly corresponds to the lock tongue, and the lock bolt clutch component corresponds to the lock bolt. The lock tongue can drive the lock bolt to retract during the retraction process. When the clutch assembly is in the first state and both the lock tongue and lock bolt are in the extended position, the lock tongue clutch component is in an engaged state with respect to the lock bolt, and the lock bolt clutch component is in a separated state with respect to the bolt. At this time, the lock tongue clutch component can be used to restrict the retraction of the lock bolt, i.e., the clutch assembly is in the locked state, ensuring that the lock bolt is securely inserted into the latch. When the clutch assembly is in the second state and the lock bolt is in the retracted state, the lock tongue clutch component is in a separated state with respect to the latch, and the lock bolt clutch component is in an engaged state with respect to the bolt. At this time, the lock bolt clutch component can be used to restrict the extending movement of the lock bolt, while the lock tongue can extend or retract normally under the action of the handle assembly. The clutch assembly is in the unlocked state. Therefore, by setting up the clutch assembly, the retraction movement of the lock bolt (i.e., the unlocking action of the door lock device) can be linked with the retraction action of the lock tongue driven by the handle assembly. Moreover, the locked state of the lock tongue is maintained through mechanical limiting provided by the lock tongue clutch component, which can prevent direct drive of the lock bolt and lock tongue by the electro-controlled actuator, thereby reducing the risk of failure in the door lock device and improving its safety and reliability.

Description of the reference manual

Figure 1:
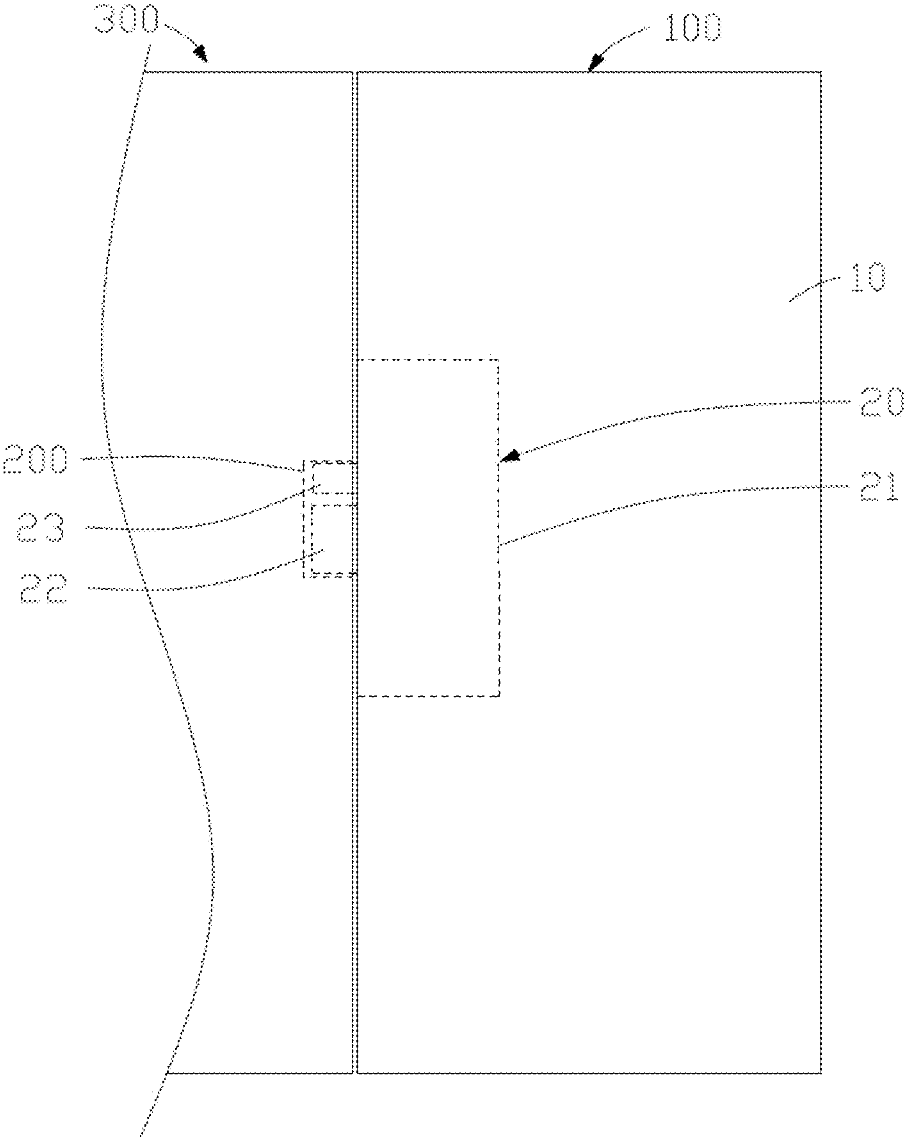
FIG. 1 is a schematic structural diagram of a door and a latch in a connected and locked state according to an embodiment of the present disclosure.
Figure 2:
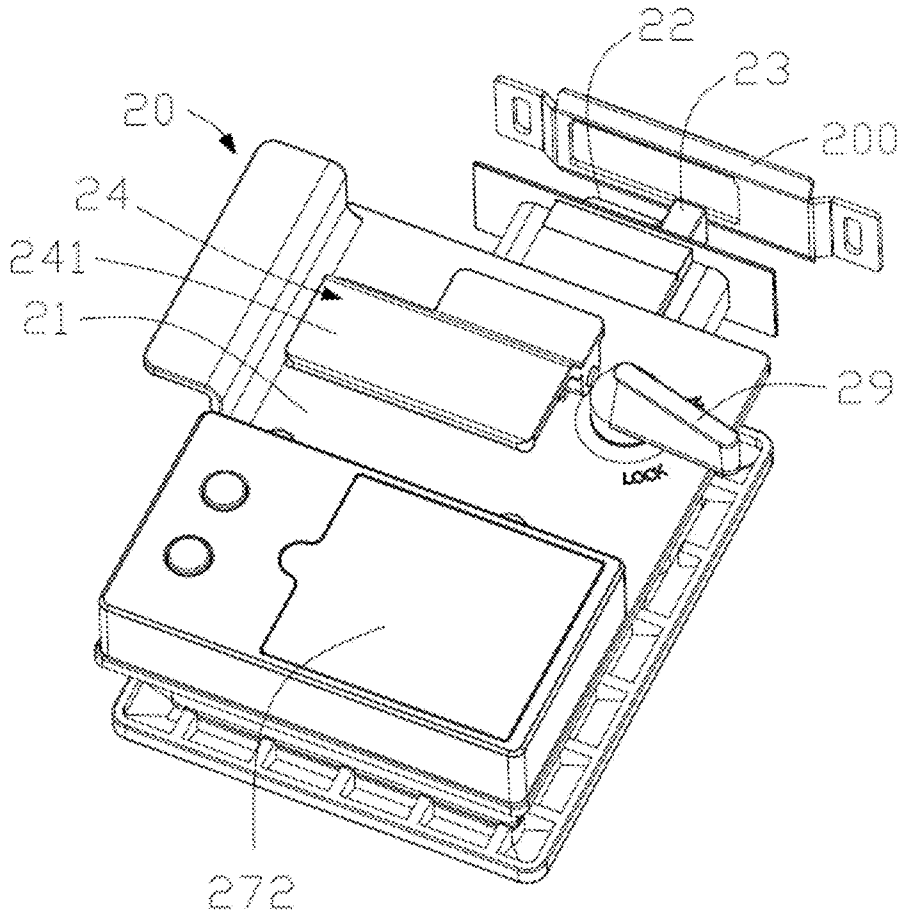
FIG. 2 is a schematic structural diagram of the door lock device, with the door in a locked state and is disengaged from the latch according to an embodiment of the present disclosure.
Figure 3:
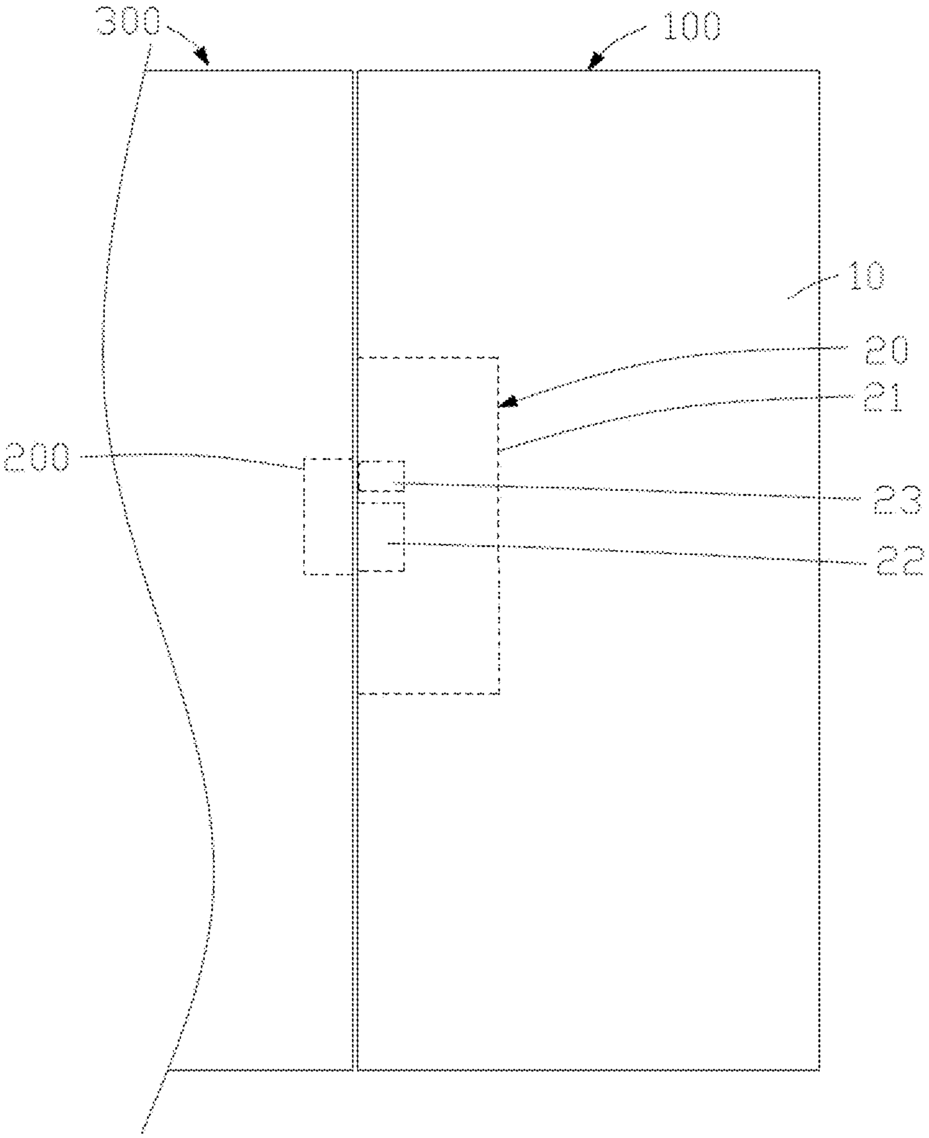
FIG. 3 is a schematic structural diagram of the door lock device according to an embodiment of the present disclosure, where the door and latch are in an unlocked state.
Figure 4:
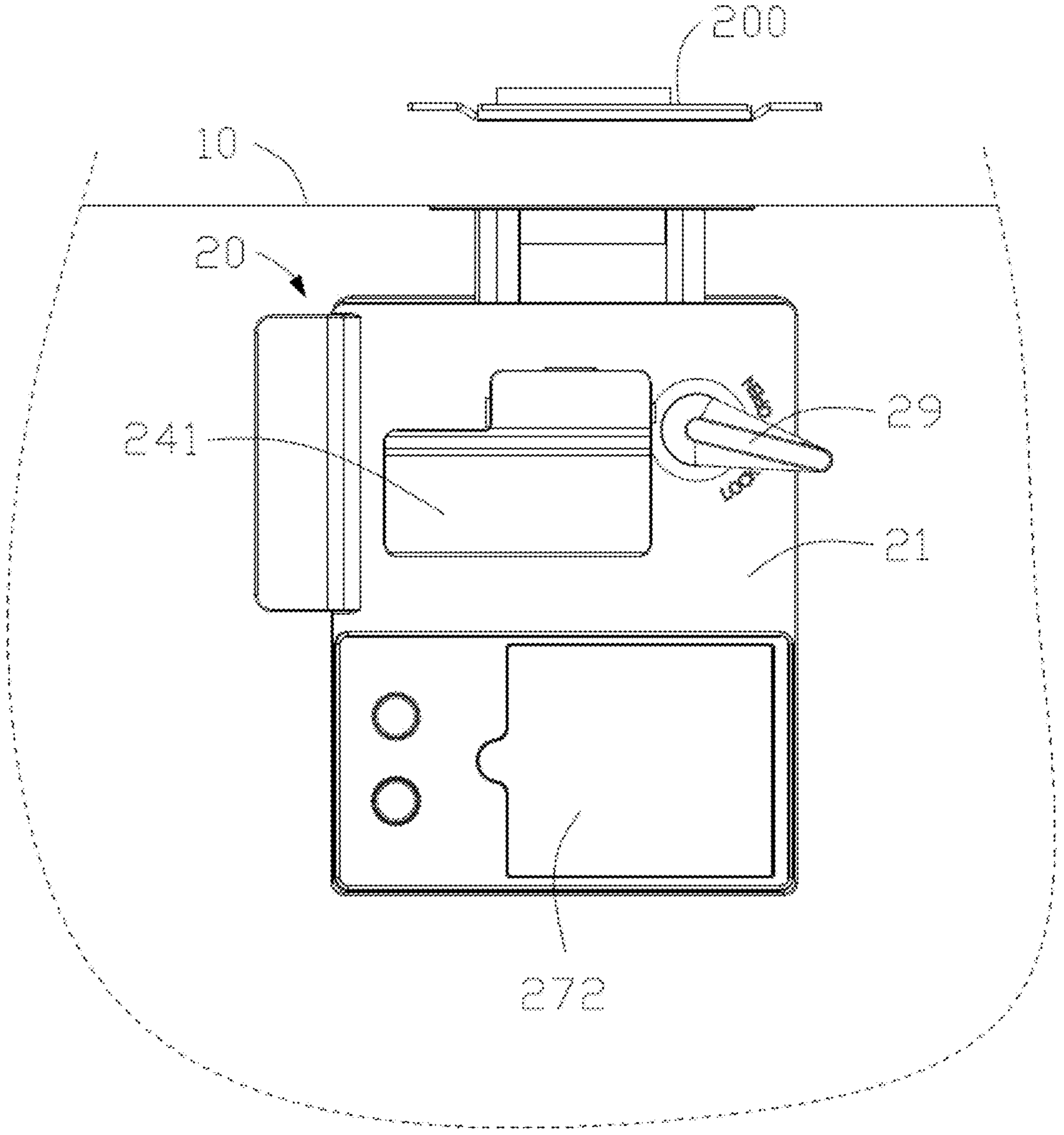
FIG. 4 is a schematic structural diagram of the door lock device according to an embodiment of the present disclosure, where the door is in the unlocked state and disengaged from the latch.

| Description | Reference numeral |
|---|---|
| door | 100 |
| main body | 10 |
| door lock device | 20 |
| housing | 21 |
| first accommodating chamber | 211 |
| second accommodating chamber | 212 |
| lock tongue | 22 |
| second protrusion | 221 |
| third protrusion | 222 |
| fourth protrusion | 223 |
| lock bolt | 23 |
| first connecting part | 231 |
| second connecting part | 232 |
| handle assembly | 24 |
| second handle | 241 |
| third handle | 242 |
| first rotating shaft | 243 |
| second rotating shaft | 244 |
| clutch assembly | 25 |
| lock tongue clutch component | 251 |
| first protrusion | 2511 |
| guiding groove | 2512 |
| lock bolt clutch component | 252 |
| hook part | 2521 |
| inclined surface | 2522 |
| transmission mechanism | 253 |
| swing arm | 2531 |
| first end | 25311 |
| second end | 25312 |
| first elastic component | 254 |
| second elastic component | 261 |
| third elastic component | 262 |
| first driving assembly | 27 |
| controller | 271 |
| electronic control device | 2711 |
| password input module | 27111 |
| control panel | 27112 |
| circuit board | 27113 |
| driving motor | 2712 |
| output shaft | 27121 |
| battery | 272 |
| second driving assembly | 28 |
| lock cylinder | 281 |
| connecting component | 282 |
| first handle | 29 |
| latch | 200 |
| mobile vehicle | 300 |
| first direction | X |
| second direction | Y |

The following specific embodiments will be further explained in conjunction with the attached drawings.

DETAILED DESCRIPTION OF THE EMBODIMENTS

The following description will combine the drawings to describe the technical solutions in the embodiments of the present disclosure. Clearly, the described embodiments are only part of the embodiments of the present disclosure, not all the embodiments.

It should be noted that when an element is considered to be "connected" to another element, it can be directly connected to the other element or may have an intermediate element placed between them. When an element is considered to be "provided" on another element, it can be directly placed on the other element or may have an intermediate element positioned between them.

Unless otherwise defined, all technical and scientific terms used herein have the meanings commonly understood by those skilled in the art of the technical field to which the present disclosure pertains. The terms used in the description of the embodiments in the present disclosure are for the purpose of describing specific embodiments only and are not intended to limit the present disclosure.

In the description of the embodiments of the present disclosure, the technical terms "first", "second", etc., are used only to distinguish between different objects and should not be construed as indicating or implying relative importance or specifying the number, specific order, or priority of the technical features indicated. In the description of the embodiments of the present disclosure, "multiple" means more than two, unless otherwise clearly specified.

It should be noted that the thickness, length, width, and other dimensions of various components shown in the drawings of the embodiments of the present disclosure, as well as the overall dimensions of the integrated device, are for illustrative purposes only and should not be construed as limiting the present disclosure.

The following is a further description of the embodiments of the present disclosure in conjunction with the drawings.

As shown in FIGS. 1 to 4, this embodiment of the present disclosure provides a door 100, which includes a main body 10 and a door lock device 20. The door lock device 20 is mounted on the main body 10.

In one embodiment, when the door 100 is movably installed on a building or a mobile vehicle 300, a latch 200 is installed at a position corresponding to the closed door 100 on the building or mobile vehicle 300. The door lock device 20 can be connected to the latch 200, such that the door 100 is locked to the latch 200, and the building or mobile vehicle 300 is in a closed state. By disengaging the connection between the door lock device 20 and the latch 200, the door 100 can rotate or move relative to the main body 10 of the building or the mobile vehicle 300, making the building or mobile vehicle 300 in an open state.

Another embodiment of the present application provides a door lock device 20, which can be applied to the aforementioned door 100.

To facilitate understanding and description, the following embodiment adopts the door lock device 20 mounted on the main body 10 of the door 100 as an example for further explanation.

In this embodiment, the door lock device 20 includes a housing 21, a lock tongue 22, and a lock bolt 23. The housing 21 can be fixedly mounted on the main body 10, and the lock tongue 22 and lock bolt 23 can be movably set within the housing 21.

The lock tongue 22 has an extended state and a retracted state relative to the housing 21, and the lock bolt 23 has an extended state and a retracted state relative to the housing 21.

If both the lock tongue 22 and the lock bolt 23 are in the extended state, the door lock device 20 is in the locked state. If the door 100 is in the closed state, the lock tongue 22 and lock bolt 23 will engage with the latch 200, and the building or mobile vehicle 300 will be in the closed and locked state, preventing the door 100 from being opened.

If the lock bolt 23 is in the retracted state, the door lock device 20 is in the unlocked state. If the door body 100 is in the closed state, the building or mobile vehicle 300 will be in the closed but unlocked state, and the door body 100 can be opened by retracting the lock tongue 22.

It should be noted that the extended state of the lock tongue 22 relative to the housing 21 refers to the situation where the end of the lock tongue 22 extends completely or partially, exposing it outside the housing 21. The retracted state of the lock tongue 22 relative to the housing 21 refers to the situation where the end of the lock tongue 22 is fully retracted into the housing 21, or the end of the lock tongue 22 is flush with the surface of the housing 21. The extended state of the lock bolt 23 relative to the housing 21 refers to the situation where the end of the lock bolt 23 extends completely or partially, exposing it outside the housing 21. The retracted state of the lock bolt 23 relative to the housing 21 refers to the situation where the end of the lock bolt 23 is fully retracted into the housing 21, or the end of the lock bolt 23 is flush with the surface of the housing 21.

Figure 5:
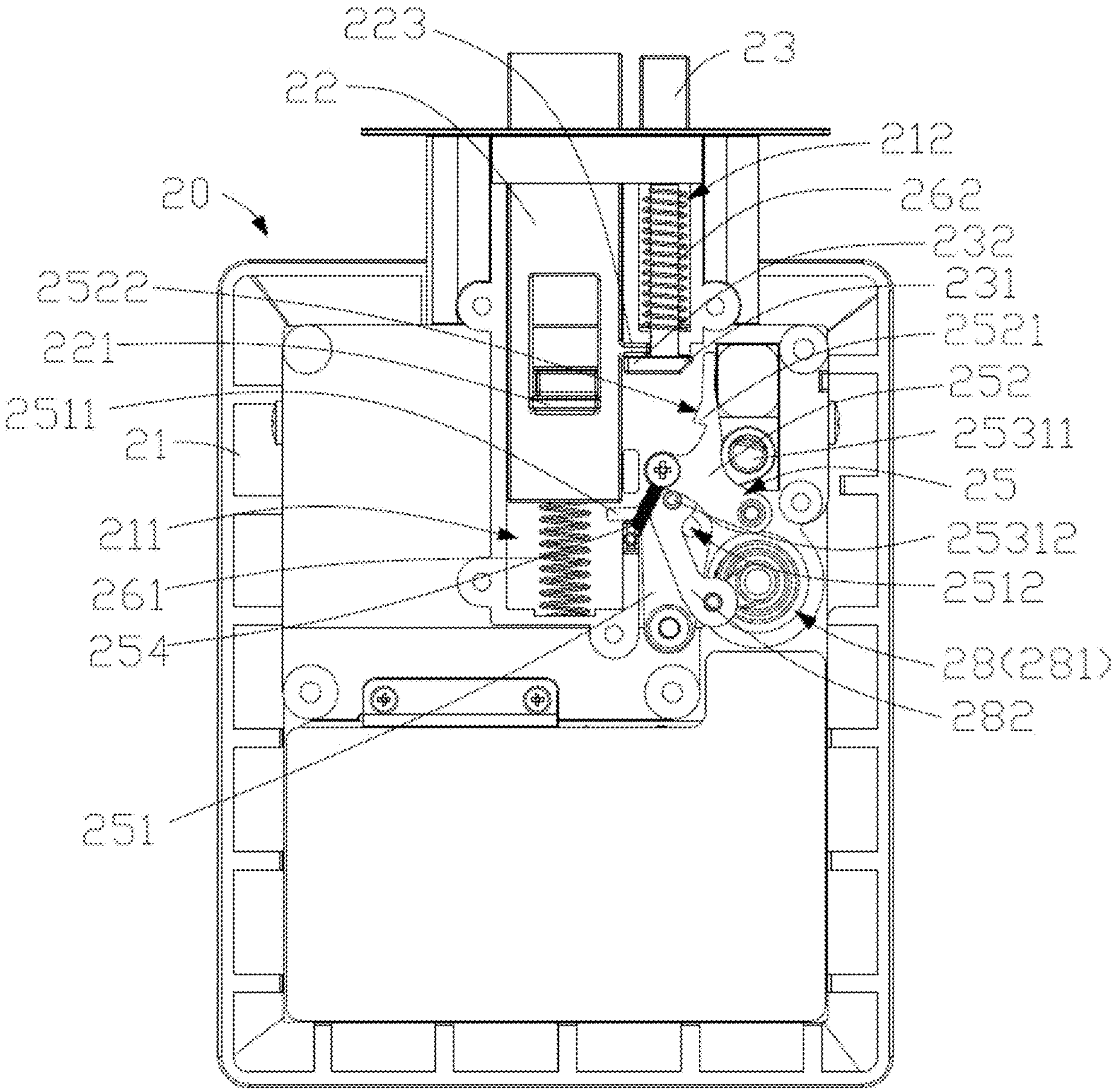
FIG. 5 is a schematic structural diagram of the door lock device in the locked state according to an embodiment of the present disclosure.
Figure 6:
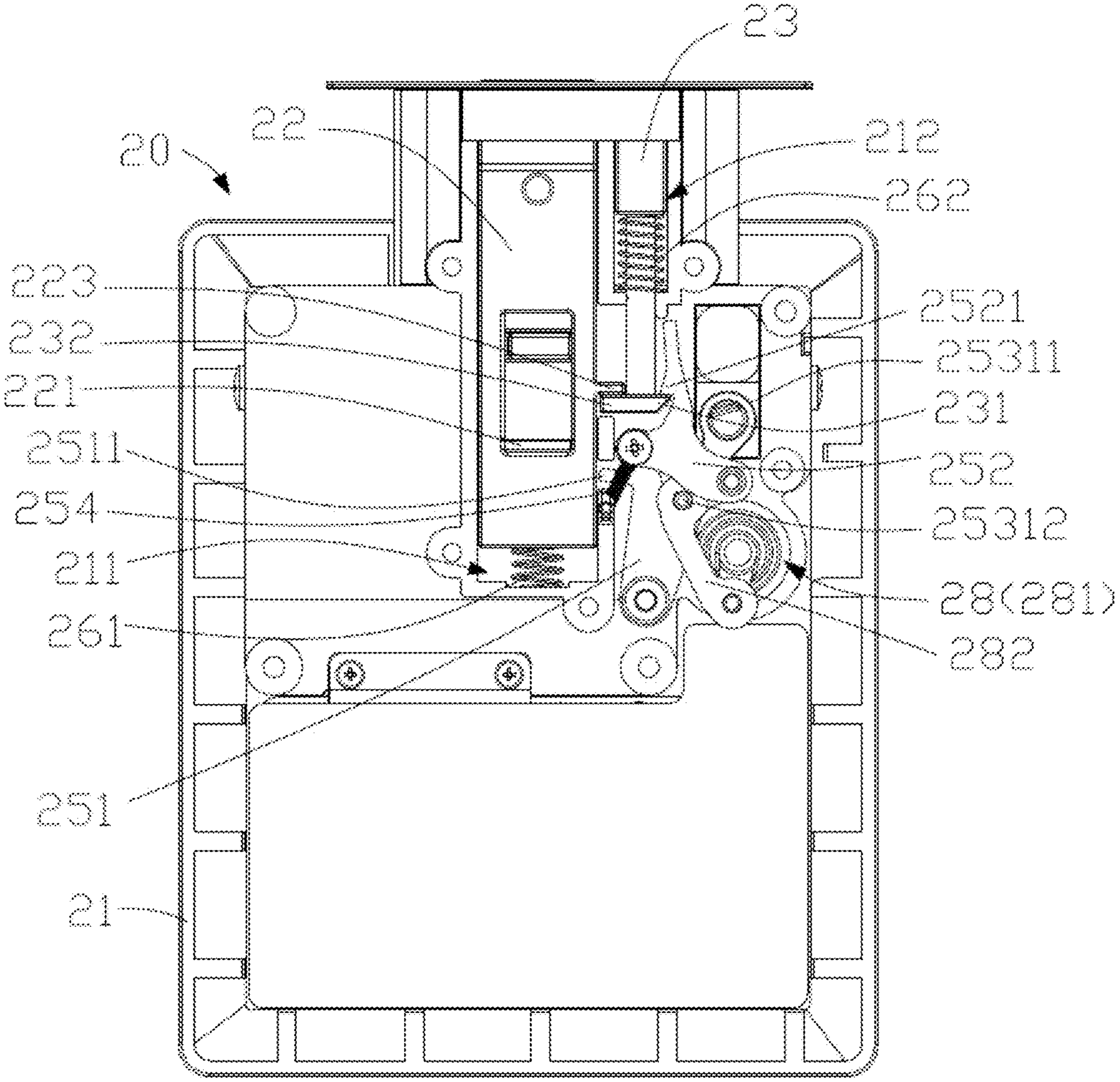
FIG. 6 is a schematic structural diagram of the door lock device in the unlocked state according to an embodiment of the present disclosure.
Figure 7:
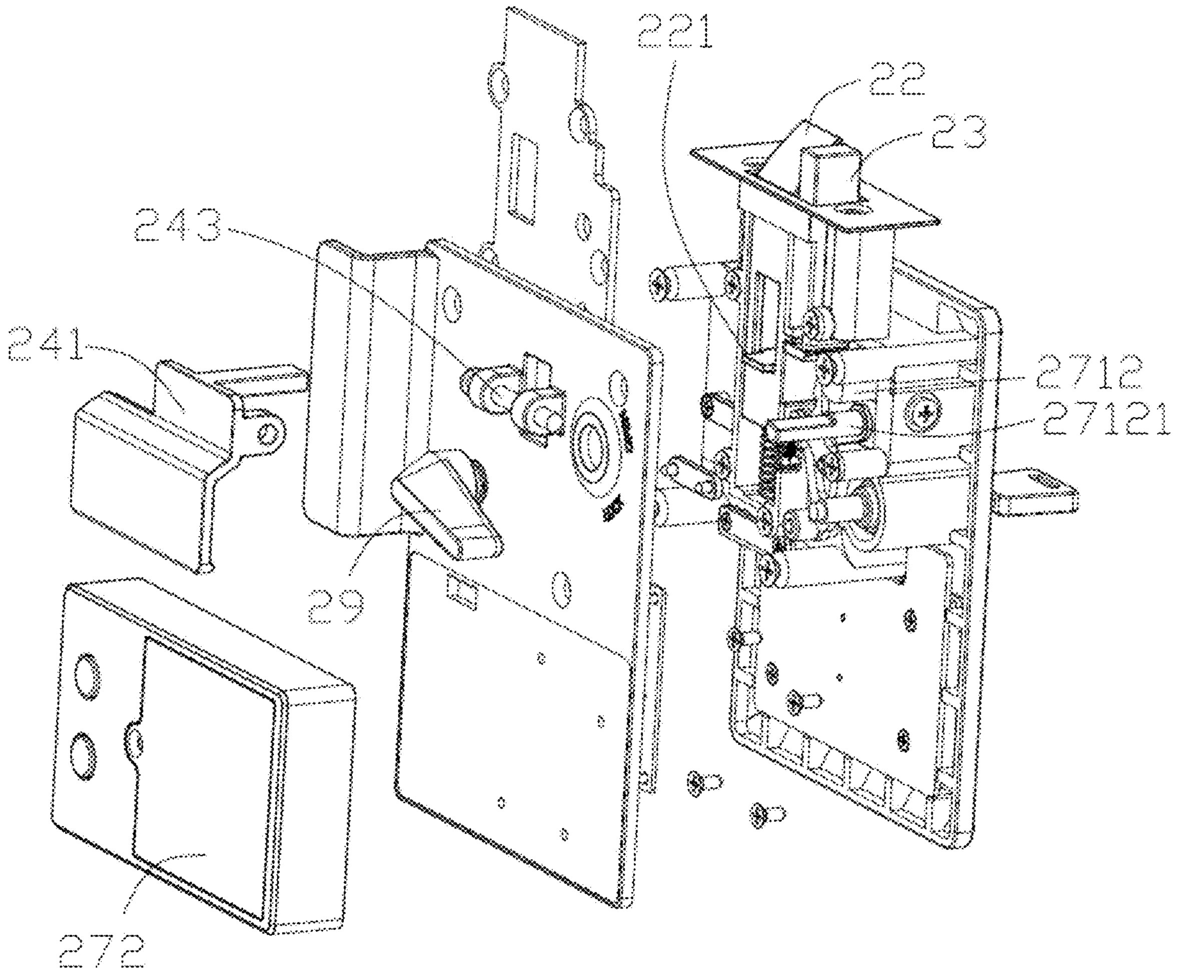
FIG. 7 is an exploded view of the door lock device in the locked state according to an embodiment of the present disclosure.
Figure 8:
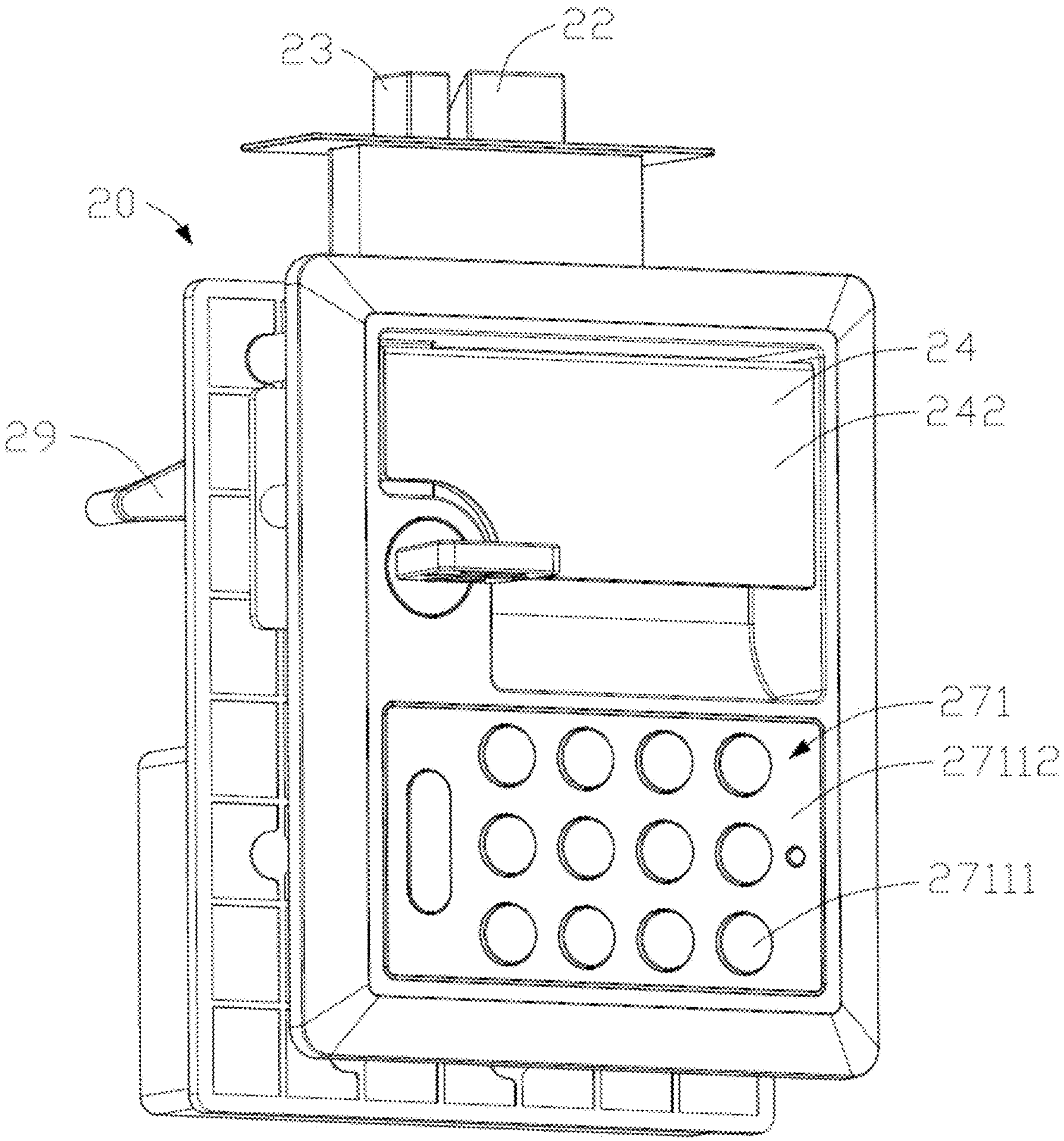
FIG. 8 is another schematic structural diagram of door lock device in the locked state according to an embodiment of the present disclosure.
Figure 9:
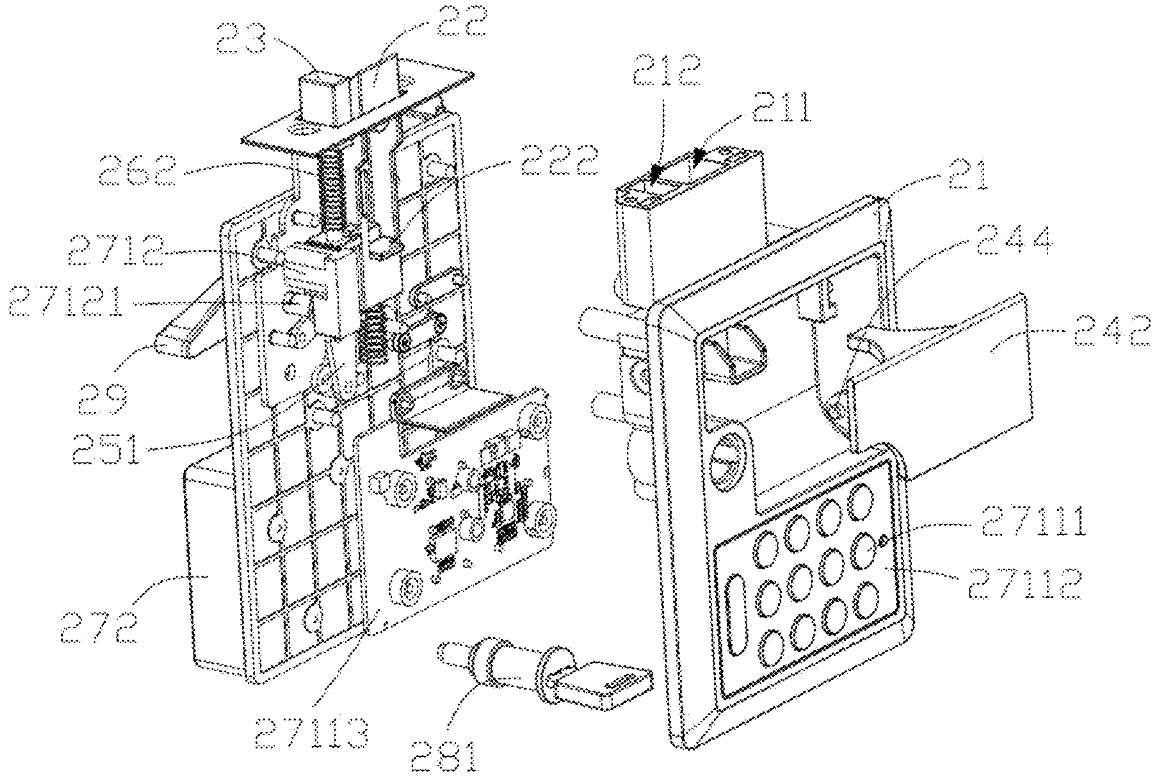
FIG. 9 is another exploded view of the door lock device in the locked state according to an embodiment of the present disclosure.
Figure 10:
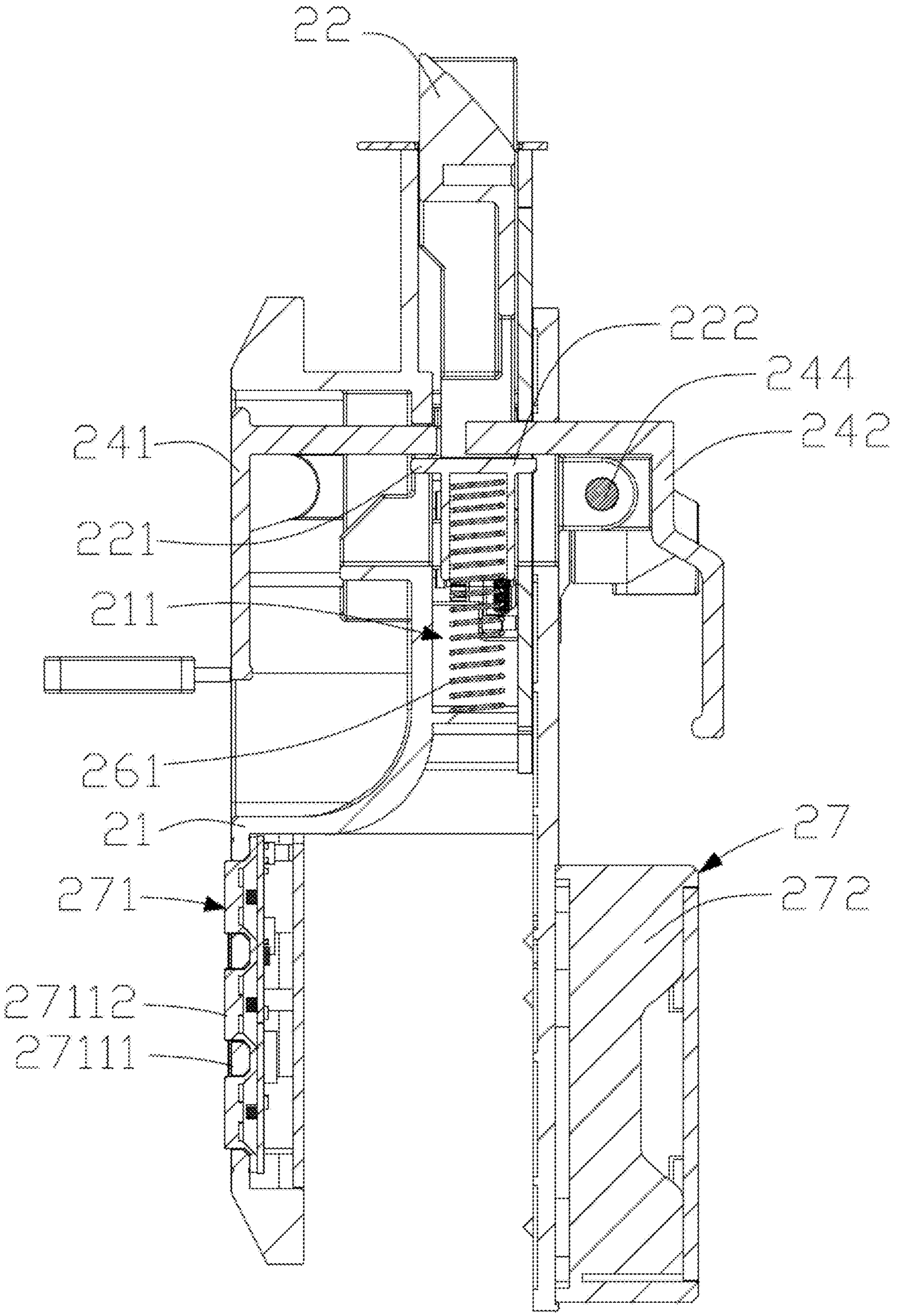
FIG. 10 is a cross-sectional view of the door lock device in the locked state according to an embodiment of the present disclosure.

As shown in FIGS. 5 and 6, in one embodiment, the housing 21 includes a first accommodating chamber 211, within which the lock tongue 22 is movably arranged relative to the housing 21. By providing the first accommodating chamber 211 to accommodate the lock tongue 22, the first accommodating chamber 211 serves to guide and limit the lock tongue 22 from extending or retracting relative to the housing 21, improving the stability of the movement of the lock tongue 22.

In one embodiment, the housing 21 includes a second accommodating chamber 212, within which the lock bolt 23 is movably arranged relative to the housing 21. By providing the second accommodating chamber 212 to accommodate the lock bolt 23, the second accommodating chamber 212 serves to guide and limit the movement of the lock bolt 23 relative to the housing 21, improving the stability of the movement of the lock bolt 23.

In one embodiment, there may also be a linkage between the lock tongue 22 and the lock bolt 23. Specifically, during the transition of the lock tongue 22 from the extended state to the retracted state, the lock tongue 22 can drive the lock bolt 23 to retract synchronously relative to the housing 21. That is, when both the lock tongue 22 and the lock bolt 23 are in the extended state, the unlocking of the door lock device 20 can be achieved by unlocking the lock tongue 22, which will simultaneously unlock the lock bolt 23. Compared to the traditional methods where the lock bolt 23 is unlocked directly by electrical control or a key, this embodiment achieves the unlocking of the lock bolt 23 through the linkage between the lock tongue 22 and the lock bolt 23, improving the reliability and security of the door lock device 20 and extending its service life.

In one embodiment, the lock tongue 22 includes a fourth protrusion 223, which is located on a side of the lock tongue 22 facing the lock bolt 23. The lock bolt 23 includes a second connecting part 232, which is located on the side of the lock bolt 23 facing the lock tongue 22. Along an extension direction of the lock tongue 22 or the lock bolt 23, the fourth protrusion 223 is located on the side of the second connecting part 232 facing outward from the housing 21. When both the lock tongue 22 and the lock bolt 23 are in the extended state, and the lock tongue 22 begins to retract, the fourth protrusion 223 is configured to connect with the second connecting part 232, and by abutting against the second connecting part 232, it drives the lock bolt 23 to retract synchronously until both the lock tongue 22 and the lock bolt 23 reach the retracted state. In this embodiment, the lock tongue 22 and the lock bolt 23 achieve synchronized retraction through the fourth protrusion 223 and the second connecting part 232. The user only needs to perform the action of driving the lock tongue 22 to retract, which will drive the lock bolt 23 to retract simultaneously, unlocking the door 100. This linkage structure is simple and reliable, which improves the reliability of the door lock device 20.

As shown in FIG. 2, and FIGS. 5 to 10, in one embodiment, the door lock device 20 further includes a handle assembly 24. The handle assembly 24 is rotatably connected to the housing 21 and is also connected to the lock tongue 22. By rotating the handle assembly 24, the lock tongue 22 can be extended or retracted relative to the housing 21. Specifically, when the lock tongue 22 is in the extended state, rotating the handle assembly 24 will cause the lock tongue 22 to switch from the extended state to the retracted state. Further, if the lock bolt 23 is also in the extended state, during the process of retracting the lock tongue 22 driven by the handle assembly 24, the lock tongue 22 will also drive the lock bolt 23 to retract synchronously. That is, when both the lock tongue 22 and the lock bolt 23 are in the extended state, rotating the handle assembly 24 will simultaneously retract both the lock tongue 22 and the lock bolt 23, unlocking the door lock device 20.

In one embodiment, the handle assembly 24 can be arranged on one side of the door lock device 20 along the thickness direction, or on both sides of the door lock device 20 along the thickness direction. When the handle assembly 24 is arranged on one side of the door lock device 20 along the thickness direction, the handle assembly 24 can be located on either the inner side or the outer side of the door 100. When the handle assembly 24 is arranged on both sides of the door lock device 20 along the thickness direction, part of the handle assembly 24 is located on the inner side of the door 100, and the other part is located on the outer side of the door 100.

In one embodiment, the handle assembly 24 includes a second handle 241, which is rotatably connected to the housing 21 via a first rotating shaft 243. During the rotation of the second handle 241 relative to the housing 21, it can abut the lock tongue 22, causing the lock tongue 22 to switch from the extended state to the retracted state. In one embodiment, the second handle 241 can be arranged on either the inner side or the outer side of the door 100.

In one embodiment, the handle assembly 24, in addition to including the second handle 241, also includes a third handle 242. The third handle 242 and the second handle 241 are respectively located on both sides of the door lock device 20 along the thickness direction, and the third handle 242 is rotatably connected to the housing 21 via a second pivot 244. During the rotation of the third handle 242 relative to the housing 21, it can abut the lock tongue 22, causing the lock tongue 22 to switch from the extended state to the retracted state. In one embodiment, the second handle 241 is arranged on the inner side of the door 100, and the third handle 242 is arranged on the outer side of the door 100. By providing the second handle 241 and the third handle 242, users can retract the lock tongue 22 through mechanical control either on the inner side or the outer side of the door 100. This not only improves convenience but also helps enhance the reliability and extend the lifespan of the door lock device 20.

In one embodiment, the lock tongue 22 has a second protrusion 221, and during the rotation of the second handle 241 relative to the housing 21, the front end of the second handle 241 facing the lock tongue 22 can abut the second protrusion 221, and by pressing against the second protrusion 221, allowing the lock tongue 22 to retract.

In one embodiment, the lock tongue 22 has a third protrusion 222, and during the rotation of the third handle 242 relative to the housing 21, the third handle 242 can abut the third protrusion 222, and by pressing against the third handle 242, allowing the lock tongue 22 to retract.

As shown in FIGS. 5, 6, and 11 to 13, in one embodiment, the door lock device 20 further includes a clutch assembly 25, which is arranged on the housing 21. The clutch assembly 25 includes a lock tongue clutch component 251 and a lock bolt clutch component 252. The lock tongue clutch component 251 corresponds to the lock tongue 22 and can be used to limit or release the lock tongue 22. The lock bolt clutch component 252 corresponds to the lock bolt 23 and can be used to limit or release the lock bolt 23.

In one embodiment, the clutch assembly 25 has a first state and a second state.

Figure 11:
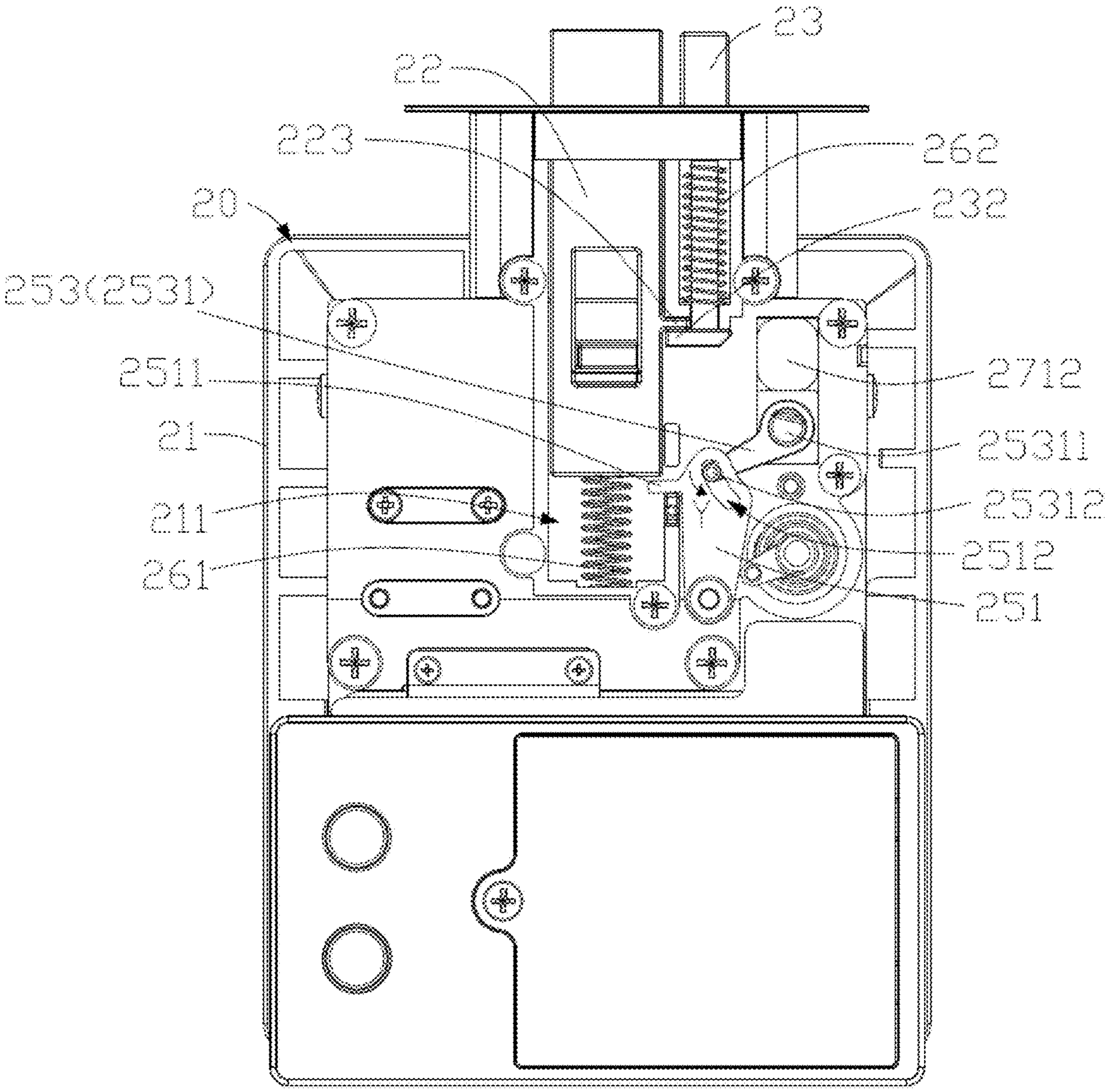
FIG. 11 a partial structural schematic diagram of the door lock device in the locked state according to an embodiment of the present disclosure.

When the clutch assembly 25 is in the first state (as shown in FIGS. 5 and 11), the lock tongue clutch component 251 is in the engaged state relative to the lock tongue 22, and the lock bolt clutch component 252 is in the disengaged state relative to the lock bolt 23. If both the lock tongue 22 and the lock bolt 23 are in the extended state, the lock tongue clutch component 251 can limit the retraction of the lock tongue 22. When the clutch assembly 25 is in the first state, and the lock tongue 22 is in the extended state, the lock tongue 22 is restricted by the lock tongue clutch component 251 and cannot retract, keeping the door lock device 20 in a locked state and preventing the door 100 from being opened.

Figure 12:
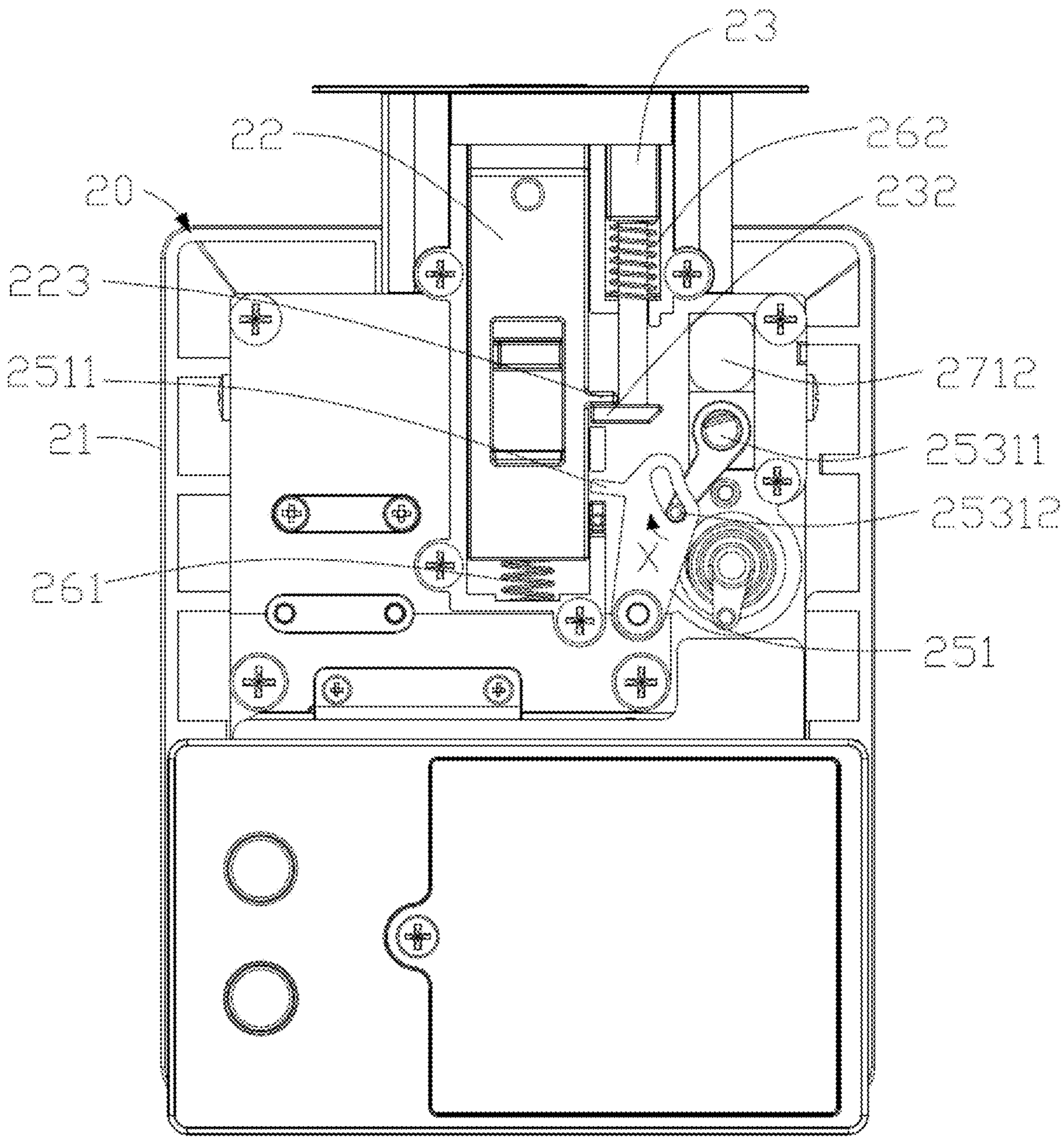
FIG. 12 is a partial structural schematic diagram of the door lock device in the unlocked state according to an embodiment of the present disclosure.
Figure 13:
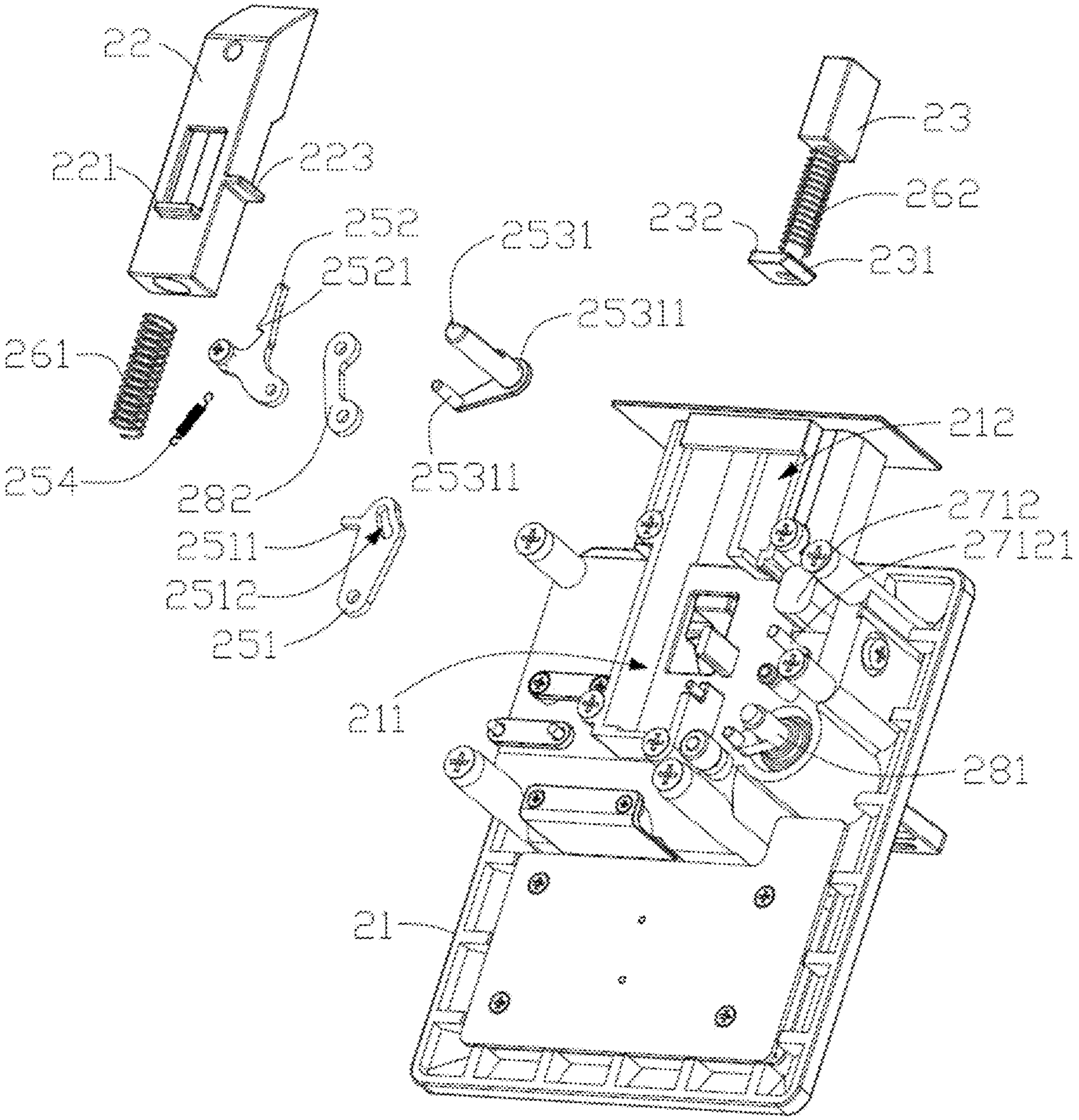
FIG. 13 is an exploded diagram of door lock device.

When the clutch assembly 25 is in the second state (as shown in FIGS. 6 and 12), the lock tongue clutch component 251 is in the disengaged state relative to the lock tongue 22, and the lock bolt clutch component 252 is in the engaged state relative to the lock bolt 23. If the lock bolt 23 is in the retracted state, the lock bolt clutch component 252 can limit the extension of the lock bolt 23. At this time, since the lock tongue clutch component 251 is in the disengaged state relative to the lock tongue 22, the movement of the lock tongue 22 is not restricted, and it can extend or retract relative to the housing 21. When the clutch assembly 25 is in the second state and the lock bolt 23 is in the retracted state, the lock bolt 23 is restricted by the lock bolt clutch component 252 and cannot extend. Meanwhile, the lock tongue 22 is configured to extend or retract relative to the housing 21, placing the door lock device 20 in an unlocked state. The door 100 can be opened by rotating the handle assembly 24.

In one embodiment, the lock tongue clutch component 251 includes a first protrusion 2511. When the lock tongue clutch component 251 is in the engaged state relative to the lock tongue 22, at least part of the first protrusion 2511 extends into the first accommodating chamber 211 and is positioned on the telescopic path of the lock tongue 22 relative to the housing 21. If the lock tongue 22 is in the extended state at this time, the first protrusion 2511 can abut the lock tongue 22 and limit the retraction movement of the lock tongue 22. When the lock tongue clutch component 251 is in the disengaged state relative to the lock tongue 22, the end of the first protrusion 2511 does not extend into the first accommodating chamber 211, and the lock tongue 22 is configured to move relative to the housing 21 within the first accommodating chamber 211. This embodiment restricts the retraction movement of the lock tongue 22 by positioning the first protrusion 2511 in the movement path of the lock tongue 22 within the first accommodating chamber 211, improving the stability and reliability of the locking state of the door lock device 20.

In one embodiment, the lock bolt 23 includes a first connecting part 231, and the lock bolt clutch component 252 includes a hook part 2521. When the lock bolt clutch component 252 is in the engaged state, the hook part 2521 is positioned along the movement path of the first connecting part 231. If the lock bolt 23 retracts at this time, the first connecting part 231 will move to abut the hook part 2521, and eventually, the hook part 2521 will engage the first connecting part 231. The engagement of the hook part 2521 with the first connecting part 231 can limit the extension movement of the lock bolt 23. At this time, the clutch assembly 25 is in the second state.

In one embodiment, the lock bolt clutch component 252 further includes a inclined surface 2522, which connects the hook part 2521. During the retraction of the lock bolt 23 when the lock bolt clutch component 252 is in the engaged state, the first connecting part 231, before engaging the hook part 2521, first contacts the inclined surface 2522 and moves along it until it engages the hook part 2521. The inclined surface 2522 acts as a transition for the relative movement between the first connecting part 231 and the lock bolt clutch component 252, reducing the frictional resistance between the two components.

In one embodiment, the first connecting part 231 has a wedge-shaped surface, and when the first connecting part 231 contacts the inclined surface 2522, the wedge-shaped surface on the first connecting part 231 contacts the inclined surface 2522, further reducing the frictional resistance between the first connecting part 231 and the lock bolt clutch component 252.

In one embodiment, the door lock device 20 further includes a second elastic component 261, which connects the lock tongue 22 and the housing 21. The second elastic component 261 generates a driving force to extend the lock tongue 22. When the lock tongue clutch component 251 is in the disengaged state relative to the lock tongue 22, the lock tongue 22 is configured to be movable relative to the housing 21. Under normal conditions, the driving force of the second elastic component 261 keeps the lock tongue 22 in a stable extended state. The provision of the second elastic component 261 enhances the stability of the lock tongue 22 in the extended state, reduces the risk of wobbling or shifting when extended, and improves the overall stability and reliability of the door lock device 20.

In one embodiment, when the lock tongue clutch component 251 transitions from the engaged state to the disengaged state relative to the lock tongue 22, the driving force of the second elastic component 261 drives the lock tongue 22 to switch from the retracted state to the extended state.

In one embodiment, the second elastic component 261 is a compression spring, with one end connected to the lock tongue 22 and the other end connected to the housing 21. In another embodiment, the second elastic component 261 can also be a torsion spring (not shown in the diagram).

In one embodiment, the door lock device 20 further includes a third elastic component 262, which connects the lock bolt 23 and the housing 21. The third elastic component 262 generates a driving force to extend the lock bolt 23. When the lock bolt clutch component 252 is in the disengaged state relative to the lock bolt 23, the lock bolt 23 is configured to move relative to the housing 21. Under normal conditions, the driving force of the third elastic component 262 keeps the lock bolt 23 in a stable extended state. The provision of the third elastic component 262 enhances the stability of the lock bolt 23 in the extended state, reduces the risk of wobbling or shifting when extended, and improves the overall stability and reliability of the door lock device 20.

In one embodiment, when the lock bolt clutch component 252 transitions from the engaged state to the disengaged state relative to the lock bolt 23, the driving force of the third elastic component 262 drives the lock bolt 23 to switch from the retracted state to the extended state.

In one embodiment, the third elastic component 262 is a compression spring, with one end connected to the lock bolt 23 and the other end connected to the housing 21. In another embodiment, the third elastic component 262 can also be a torsion spring (not shown in the diagram).

In one embodiment, the clutch assembly 25 further includes a transmission mechanism 253, which connects the lock tongue clutch component 251 and the lock bolt clutch component 252. By controlling the action of the transmission mechanism 253, the clutch assembly 25 can switch between the first state and second state. When the clutch assembly 25 is in the first state, the door 100 is prevented from opening. By controlling the action of the transmission mechanism, the clutch assembly 25 can switch to the second state, allowing the door 100 to open.

In one embodiment, the lock tongue clutch component 251 is rotatably connected to the housing 21. By rotating relative to the housing 21, the lock tongue clutch component 251 can switch between the engaged and disengaged states relative to the lock tongue 22. Designing the lock tongue clutch component 251 to be rotatable helps improve the space utilization within the door lock device 20 and enhances the structural reliability of the clutch assembly 25.

In one embodiment, the lock bolt clutch component 252 is rotatably connected to the housing 21. By rotating relative to the housing 21, the lock bolt clutch component 252 can switch between the engaged and disengaged states relative to the lock bolt 23. Designing the lock bolt clutch component 252 to be rotatable helps improve the space utilization within the door lock device 20 and enhances the structural reliability of the clutch assembly 25.

In one embodiment, when the lock bolt clutch component 252 is in the engaged state and the lock bolt 23 is retracting, the first connecting part 231 first contacts the connecting inclined surface 2522 before engaging with the hook part 2521. The first connecting part 231 presses against the lock bolt clutch component 252 through the inclined surface 2522, causing a slight rotation of the lock bolt clutch component 252, which then moves the first connecting part 231 to a position where it can engage with the hook part 2521. This connection method is simple and reliable, does not require additional components, and helps improve the spatial efficiency and reliability of the door lock device 20.

In one embodiment, the transmission mechanism 253 includes a swing arm 2531. The first end 25311 of the swing arm 2531 is rotatably connected to the housing 21, while the second end 25312 of the swing arm 2531 is movably connected to the lock tongue clutch component 251 and/or the lock bolt clutch component 252.

In one embodiment, when the swing arm 2531 rotates in the first direction X, both the lock tongue clutch component 251 and the lock bolt clutch component 252 are configured to rotate relative to the housing 21. The lock tongue clutch component 251 can switch from the disengaged state to the engaged state, and the lock bolt clutch component 252 can switch from the engaged state to the disengaged state, while the clutch assembly 25 switches from the second state to the first state.

In one embodiment, when the swing arm 2531 rotates in the second direction Y, opposite to the first direction X, both the lock tongue clutch component 251 and the lock bolt clutch component 252 are configured to rotate relative to the housing 21. The lock tongue clutch component 251 can switch from the engaged state to the disengaged state, and the lock bolt clutch component 252 can switch from the disengaged state to the engaged state, while the clutch assembly 25 switches from the first state to the second state.

In one embodiment, the lock tongue clutch component 251 is provided with a guiding groove 2512, and the second end 25312 of the swing arm 2531 is inserted into the guiding groove 2512. During the rotation of the swing arm 2531 in either the first direction X or the second direction Y, the second end 25312 can move relative to the lock tongue clutch component 251 along the guiding groove 2512, and the second end 25312 can abut the inner wall of the guiding groove 2512. The inner wall of the guiding groove 2512 provides a rotational driving force to the lock tongue clutch component 251, causing it to rotate relative to the housing 21 and switch between the separated and engaged states. This embodiment transmits the rotational driving force by inserting the second end 25312 of the swing arm 2531 into the guiding groove 2512 of the lock tongue clutch component 251, which helps save space and improves the spatial efficiency of the door lock device 20.

In one embodiment, the extension direction of the guiding groove 2512 is configured as an arc, which improves the smoothness of the relative movement between the second end 25312 and the inner wall of the guiding groove 2512, reducing wear and resistance.

In one embodiment, during the rotation of the swing arm 2531 in the first direction X, the interaction force between the second end 25312 of the swing arm 2531 and the inner wall of the guiding groove 2512 causes the lock tongue clutch component 251 to rotate, switching it from the disengaged state to the engaged state. At this time, if the lock tongue 22 is in the extended state, it will be restricted from retracting, and the door lock device 20 will be prohibited from unlocking.

In one embodiment, during the rotation of the swing arm 2531 in the first direction X, in addition to pushing the lock tongue 22 to rotate by abutting the inner wall of the guiding groove 2512, the second end 25312 may also abut the lock bolt clutch component 252, causing the lock bolt clutch component 252 to switch from the engaged state to the disengaged state. At this point, the restriction on the extension of the lock bolt 23 by the lock bolt clutch component 252 is released, and the lock bolt 23 is allowed to extend relative to the housing 21, thereby switching the door lock device 20 to the locked state.

In one embodiment, during the rotation of the swing arm 2531 in the first direction X, the swing arm 2531 simultaneously drives the rotation of both the lock tongue clutch component 251 and the lock bolt clutch component 252. The lock tongue clutch component 251 switches from the disengaged state to the engaged state, the lock bolt clutch component 252 switches from the engaged state to the disengaged state, and the clutch assembly 25 switches from the second state to the first state. This embodiment achieves the linkage between the lock tongue clutch component 251 and the lock bolt clutch component 252 with a single mechanical rotation of the swing arm 2531, reducing the number of parts in the door lock device 20, saving space, and improving the structural reliability of the door lock device 20.

In one embodiment, the clutch assembly 25 further includes a first elastic element 254, which connects the lock bolt clutch component 252 and the housing 21. The first elastic element 254 provides a driving force to rotate the lock bolt clutch component 252, which is configured to drive the lock bolt clutch component 252 from the disengaged state to the engaged state.

Additionally, when the lock bolt clutch component 252 is in the engaged state, the first elastic element 254 applies a force to the lock bolt clutch component 252 to limit its rotation towards the disengaged state. By providing the first elastic element 254, the stability of the engagement between the lock bolt clutch component 252 and the lock bolt 23 is improved, reducing the risk of wobbling when the lock bolt clutch component 252 is in the engaged state and enhancing the reliability of the door lock device 20.

In one embodiment, the first elastic element 254 is a tension spring, one end of which is connected to the lock bolt clutch component 252, and the other end is connected to the housing 21. In one embodiment, the first elastic element 254 may be a torsion spring.

In one embodiment, the door lock device 20 further includes a first driving assembly 27. The first driving assembly 27 is an electrical module, and it connects the housing 21 and the first end 25311. The first driving assembly 27 is configured to provide a driving force to the swing arm 2531 for rotation in the first direction X or the second direction Y.

In one embodiment, the first driving assembly 27 includes a controller 271. The controller 271 connects the housing 21 and the swing arm 2531. The controller 271 is configured to drive the swing arm 2531 to rotate in the first direction X or the second direction Y In this embodiment, the rotation of the swing arm 2531 is electrically controlled by the controller 271, which helps to improve the intelligence of the door lock device 20 and enhance the user experience. Moreover, the controller 271 is only responsible for controlling the rotation of the swing arm 2531, i.e., it only controls the switching of the clutch assembly 25 between the first and second states and does not directly drive the lock bolt 22 or the lock bolt 23. This improves the safety and reliability of the door lock device 20.

In one embodiment, the controller 271 includes an electronic control device 2711 and a driving motor 2712. The electronic control device 2711 connects to the driving motor 2712, and the output shaft 27121 of the driving motor 2712 connects to the first end 25311 of the swing arm 2531. The rotation of the output shaft 27121 can be controlled by the electronic control device 2711, causing the swing arm 2531 to rotate in the first direction X or the second direction Y This embodiment improves the intelligence of the door lock device 20 and enhances the user experience by controlling the swing arm 2531 through the electronic control module and the driving motor 2712.

In one embodiment, the electronic control device 2711 includes a circuit board 27113.

In one embodiment, the electronic control device 2711 includes at least one of a password input module 27111, a remote control module, a fingerprint recognition module, a facial recognition module, a palm print recognition module, an iris recognition module, a voiceprint recognition module, a near field communication (NFC) module, a Bluetooth module, or a mobile terminal signal transmission module. The user can trigger any of these modules to make the electronic control device 2711 control the operation of the driving motor 2712, causing the swing arm 2531 to rotate in a preset direction, thereby unlocking or locking the door lock device 20.

In one embodiment, the password input module 27111 includes a control panel 27112. The control panel 27112 is set on the surface of the door lock device 20. When the door body 100 is installed on a house or a mobile vehicle 300, the control panel 27112 is located on the outside of the door body 100. The user can trigger the electronic control device 2711 by touching or pressing the control panel 27112 from the outside of the house or the mobile vehicle 300.

In one embodiment, the output shaft 27121 of the driving motor 2712 is a D-shaped shaft, and the first end 25311 includes a D-shaped hole. The D-shaped shaft is inserted into the D-shaped hole, which helps to improve the stability of the connection between the output shaft 27121 of the driving motor 2712 and the swing arm 2531 and reduces the risk of sliding between them.

In one embodiment, the first driving assembly 27 further includes a battery 272, which is arranged in the housing 21 and electrically connected to the controller 271. The battery 272 is used to power the controller 271.

In one embodiment, the door lock device 20 further includes a first handle 29. The first handle 29 is connected to the first end 25311. By rotating the first handle 29, the swing arm 2531 can be rotated in the first direction X or the second direction Y The connection between the first handle 29 and the swing arm 2531 is mechanical, and the rotation of the first handle 29 controls the rotation of the swing arm 2531, thereby switching the clutch assembly 25 between the first and second states. This helps to improve the structural reliability of the door lock device 20.

In one embodiment, the first handle 29 is positioned at one end of the door lock device 20 along the thickness direction. Furthermore, when the door body 100 is installed on a house or a mobile vehicle 300, the first handle 29 is located on the inside of the door body 100. The user can hold the first handle 29 inside the house or mobile vehicle 300 and rotate it to drive the swing arm 2531, thereby making the door lock device 20 either in a locked state, prohibiting opening, or an unlocked state, allowing opening.

In one embodiment, the door lock device 20 can include either the first driving assembly 27 or the first handle 29.

In one embodiment, the door lock device 20 may simultaneously include both the first driving assembly 27 and the first handle 29. Both electrical control and mechanical control can be used to control the clutch assembly 25, providing users with multiple options. This ensures that if one method fails, the door body 100 can still be unlocked by another method, improving the reliability of the door lock device 20.

In one embodiment, when the clutch assembly 25 is in the first state, and the first driving assembly 27 drives the swing arm 2531 to rotate in the second direction Y, the second end 25312 of the swing arm 2531 drives the lock tongue clutch component 251 to rotate from the engaged state towards the separation state. At this point, the force acting on the lock bolt clutch component 252 is reduced or disappears, and this force is smaller than the elastic force of the first elastic component 254 acting on the lock bolt clutch component 252, causing the lock bolt clutch component 252 to move from the separation state towards the engaged state, until the lock tongue clutch component 251 rotates to the separation state, and the lock bolt clutch component 252 rotates to the engaged state.

In one embodiment, the door lock device 20, in addition to including the first driving assembly 27, also includes a second driving assembly 28. The second driving assembly 28 connects to the second end 25312 of the swing arm 2531 and is used to drive the swing arm 2531 to rotate in the first direction X or the second direction Y The second driving assembly 28 is a mechanical structure. When the door body 100 is installed on a house or a mobile vehicle 300, at least part of the second driving assembly 28 is located on the outside of the door body 100, allowing the user to manually operate the second driving assembly 28 to release the locked state of the door lock device 20. This embodiment provides both the controller 271 and the second driving assembly 28. If the user cannot open the door using the controller 271 (e.g., due to a depleted battery), the mechanical control of the second driving assembly 28 allows the door body 100 to be opened, improving the reliability of the door lock device 20.

In one embodiment, the second driving assembly 28 includes a lock cylinder 281 and a connecting component 282. The lock cylinder 281 is arranged in the housing 21, and the connecting component 282 is rotatably connected between the lock cylinder 281 and the second end 25312. By rotating the lock cylinder 281 with a corresponding key, the connecting component 282 drives the swing arm 2531 to rotate in the first direction X or the second direction Y, thereby locking or unlocking the door lock device 20 and changing the door body 100 between a locked state and an unlocked state.

In one embodiment, one end of the connecting component 282 is rotatably connected to the lock cylinder 281, and the other end is rotatably connected to the second end 25312. The connecting component 282 forms a connecting arm structure, which helps save space and improves the space utilization in the door lock device 20.

Figure 14:
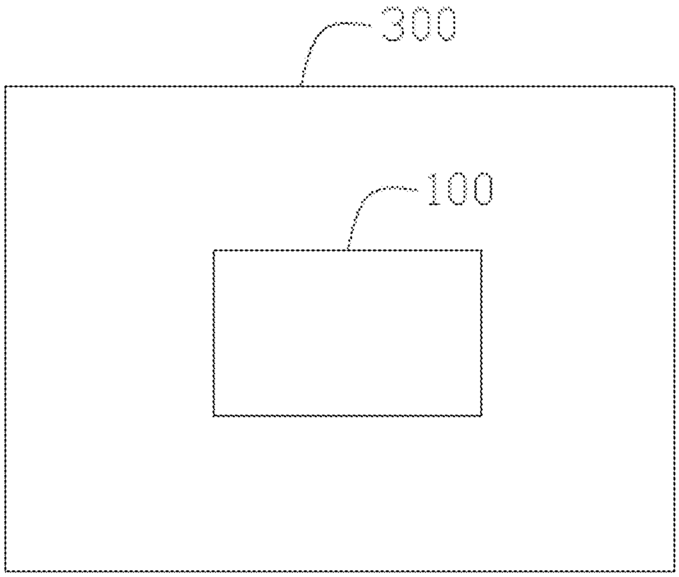
FIG. 14 is a schematic structural diagram of a mobile vehicle according to an embodiment of the present disclosure.

As shown in FIG. 14, the embodiment of the present disclosure also provides a mobile vehicle 300, which includes the aforementioned door body 100.

In one embodiment, the mobile vehicle 300 is a motorhome, yacht, or car.

The above are only specific embodiments of the present disclosure. However, the scope of protection of the present disclosure is not limited to these. Any changes or replacements within the technical scope disclosed in the present disclosure should be covered by the disclosure of the present disclosure.

What is claimed is:

1. A door lock device, comprising a housing, a lock tongue, a lock bolt, a clutch assembly, and a handle assembly, wherein the lock tongue, lock bolt, and clutch assembly are arranged within the housing, and the handle assembly is rotatably connected to the housing;

the lock tongue has an extended state and a retracted state relative to the housing, and when the handle assembly is rotated, the lock tongue is driven to switch from the extended state to the retracted state; and the lock bolt has an extended state and a retracted state relative to the housing, and when the lock tongue switches from the extended state to the retracted state, the lock tongue drives the lock bolt to retract relative to the housing;

the clutch assembly comprises a lock tongue clutch component and a lock bolt clutch component, and the clutch assembly has a first state and a second state;

when the clutch assembly is in the first state, the lock tongue clutch component is in an engaged state relative to the lock tongue, and the lock bolt clutch component is in a disengaged state relative to the lock bolt; if both the lock tongue and the lock bolt are in the extended state, the lock tongue clutch component is configured to limit the lock tongue from retracting;

when the clutch assembly is in the second state, the lock tongue clutch component is in the disengaged state relative to the lock tongue, and the lock bolt clutch component is in the engaged state relative to the lock bolt; if the lock bolt is in the retracted state, the lock bolt clutch component is configured to limit the lock bolt from extending, and the lock tongue is configured to extend or retract relative to the housing;

the clutch assembly further comprises a transmission mechanism;

the transmission mechanism comprises a swing arm, with a first end of the swing arm rotatably connected to the housing, and a second end movably connected to the lock tongue clutch component and/or the lock bolt clutch component;

wherein the lock tongue clutch component is defined with a guiding groove, and the second end is inserted into the guiding groove;

when the swing arm rotates in a first direction or a second direction, the second end moves along the guiding groove relative to the lock tongue clutch component, causing the lock tongue clutch component to switch between the disengaged state and the engaged state.

2. The door lock device according to claim 1, wherein the transmission mechanism connects the lock tongue clutch component and the lock bolt clutch component; by controlling the transmission mechanism, to make the clutch assembly switching between the first state and the second state.

3. The door lock device according to claim 2, wherein the lock tongue clutch component and the lock bolt clutch component are both rotatably connected to the housing;

when the swing arm rotates in the first direction, the lock tongue clutch component and the lock bolt clutch component both rotate relative to the housing, with the lock tongue clutch component switching from the disengaged state to the engaged state, and the lock bolt clutch component switching from the engaged state to the disengaged state, to make the clutch assembly switching from the second state to the first state;

when the swing arm rotates in the second direction opposite to the first direction, the lock tongue clutch component and the lock bolt clutch component both rotate relative to the housing, with the lock tongue clutch component switching from the engaged state to the disengaged state, and the lock bolt clutch component switching from the disengaged state to the engaged state, to make the clutch assembly switching from the first state to the second state.

4. The door lock device according to claim 3, wherein when the swing arm rotates along the first direction, the second end abuts the lock bolt clutch component, causing the lock bolt clutch component to switch from the engaged state to the disengaged state.

5. The door lock device according to claim 4, wherein the clutch assembly further comprises a first elastic component, which connects the lock bolt clutch component and the housing, and the first elastic component is configured to provide a driving force that drives the lock bolt clutch component to rotate, and the driving force is configured to drive the lock bolt clutch component to switch from the disengaged state to the engaged state.

6. The door lock device according to claim 3, wherein the door lock device further comprises a first driving assembly, which is connected to the first end, and is configured to drive the swing arm to rotate along the first direction or the second direction.

7. The door lock device according to claim 6, wherein the first driving assembly comprises a controller, the controller includes an electronic control device and a driving motor, the electronic control device is connected to the driving motor, and the output shaft of the driving motor is connected to the first end; the electronic control device is configured to control the output shaft of the driving motor to rotate, leading the swing arm to rotate along the first direction or the second direction; and the electronic control device comprises at least one of the following modules: a password input module, a remote controller, a fingerprint recognition module, a facial recognition module, a palm print recognition module, an iris recognition module, a voiceprint recognition module, a near field communication (NFC) module, a Bluetooth module, or a mobile terminal signal transmission module.

8. The door lock device according to claim 6, wherein the door lock device further comprises a first handle, which is connected to the first end; and by rotating the handle, the swing arm is rotated along the first direction or the second direction.

9. The door lock device according to claim 3, wherein the door lock device further comprises a second driving assembly, which is connected to the second end, and is configured to drive the swing arm to rotate along the first direction or the second direction.

10. The door lock device according to claim 9, wherein the second driving assembly comprises a lock cylinder and a connecting component, the lock cylinder is set in the housing, and the connecting component is rotatably connected to the lock cylinder and the second end;

when the lock cylinder rotates, the connecting component drives the swing arm to rotate along the first direction or the second direction.

11. The door lock device according to claim 1, wherein the door lock device further comprises a second elastic component, which is connected to the lock tongue and the housing, and the second elastic component is configured to provide a driving force to drive the lock tongue to extend.

12. The door lock device according to claim 1, wherein the lock tongue clutch component comprises a first protrusion;

when the lock tongue clutch component is in the engaged state relative to the lock tongue, at least part of the first protrusion is located in a movement path of the lock tongue to abut the lock tongue and to limit the lock tongue from retracting;

when the lock tongue clutch component is in the disengaged state relative to the lock tongue, the first protrusion is separated from the movement path of the lock tongue.

13. The door lock device according to claim 1, wherein the door lock device further comprises a second handle, which is rotatably connected to the housing; and when the second handle rotates relative to the housing, it abuts the lock tongue, causing the lock tongue to switch from the extended state to the retracted state.

14. The door lock device according to claim 13, wherein the door lock device further comprises a third handle, with the third handle and the second handle located on opposite sides of the door lock device along a thickness direction, and the third handle is rotatably connected to the housing;

when the third handle rotates relative to the housing, it abuts the lock tongue, causing the lock tongue to switch from the extended state to the retracted state.

15. The door lock device according to claim 1, wherein the door lock device further comprises a third elastic component, the third elastic component is connected with the lock bolt and the housing, and the third elastic component provides a driving force that drives the lock bolt to extend.

16. The door lock device according to claim 1, wherein the lock bolt comprises a first connecting part, and the lock bolt clutch component includes a hook part; when the lock bolt clutch component is in the engaged state, when bolt retracts, the first connecting part and the hook part are interlocked, and the hook part is configured to restrict the lock bolt from extension.

17. The door lock device according to claim 16, wherein the lock bolt clutch component further comprises an inclined surface, the inclined surface is connected to the hook part;

when the lock bolt clutch component is in the engaged state, if the lock bolt retracts, the first connecting part comes to connect with the inclined surface.

18. A door, wherein the door comprises a door lock device;

wherein the door lock device comprises a housing, a lock tongue, a lock bolt, a clutch assembly, and a handle assembly, wherein the lock tongue, lock bolt, and clutch assembly are arranged within the housing, and the handle assembly is rotatably connected to the housing;

the lock tongue has an extended state and a retracted state relative to the housing, and when the handle assembly is rotated, the lock tongue is driven to switch from the extended state to the retracted state; and the lock bolt has an extended state and a retracted state relative to the housing, and when the lock tongue switches from the extended state to the retracted state, the lock tongue drives the lock bolt to retract relative to the housing;

the clutch assembly comprises a lock tongue clutch component and a lock bolt clutch component, and the clutch assembly has a first state and a second state;

when the clutch assembly is in the first state, the lock tongue clutch component is in an engaged state relative to the lock tongue, and the lock bolt clutch component is in a disengaged state relative to the lock bolt; if both the lock tongue and the lock bolt are in the extended state, the lock tongue clutch component is configured to limit the lock tongue from retracting;

when the clutch assembly is in the second state, the lock tongue clutch component is in the disengaged state relative to the lock tongue, and the lock bolt clutch component is in the engaged state relative to the lock bolt; if the lock bolt is in the retracted state, the lock bolt clutch component is configured to limit the lock bolt from extending, and the lock tongue is configured to extend or retract relative to the housing;

the clutch assembly further comprises a transmission mechanism;

the transmission mechanism comprises a swing arm, with a first end of the swing arm rotatably connected to the housing, and a second end movably connected to the lock tongue clutch component and/or the lock bolt clutch component;

wherein the lock tongue clutch component is defined with a guiding groove, and the second end is inserted into the guiding groove;

when the swing arm rotates in a first direction or a second direction, the second end moves along the guiding groove relative to the lock tongue clutch component, causing the lock tongue clutch component to switch between the disengaged state and the engaged state.

19. A mobile vehicle, wherein the mobile vehicle comprises the door according to claim 18.

* * * * *